Feb. 27, 1934.  W. L. SPALDING  1,948,948
PROCESS FOR THE TREATMENT OF LIQUIDS
Original Filed Oct. 5, 1925
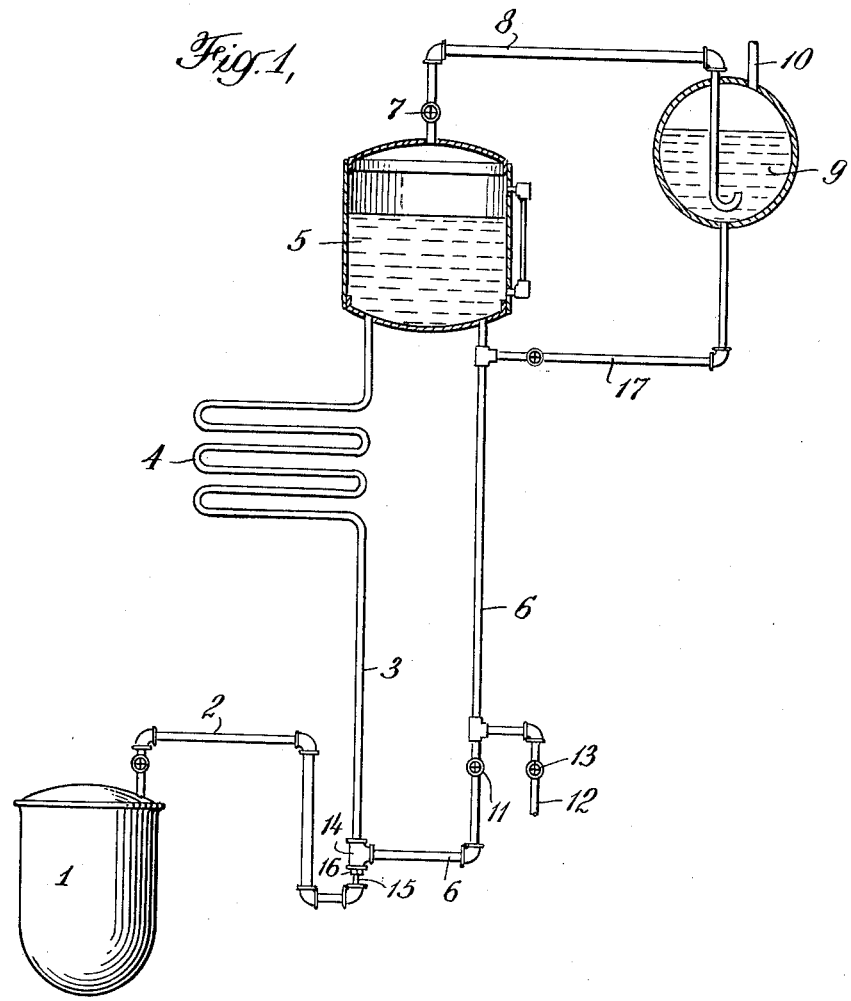
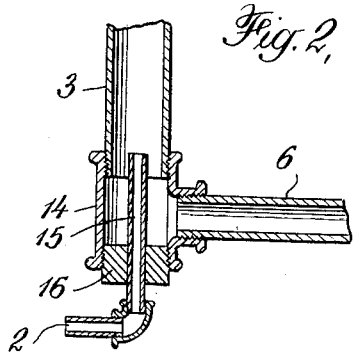
INVENTOR
WILLIAM L. SPALDING.
BY
ATTORNEY Patented Feb. 27, 1934

1,948,948

UNITED STATES PATENT OFFICE 1,948,948

PROCESS FOR THE TREATMENT OF LIQUIDS

William L. Spalding, Westfield, N. J., assignor to National Aniline & Chemical Co., Inc., New York, N. Y., a corporation of New York Original application October 5, 1925, Serial No. 60,442, now Patent No. 1,785,792. Divided and this application May 26, 1930. Serial No. 455,616

4 Claims. (Cl. 23—193)

This invention relates to a process for the treatment of liquids with ammonia and, in its specific application, for the absorption of ammonia in water to produce aqua ammonia. This application is a division of my copending application Serial No. 60,442, filed October 5, 1925, now Patent 1,785,792.

The invention, as described more fully hereinafter, provides a liquid circulatory system into which ammonia gas is vented from an autoclave. The ammonia enters the bottom of a riser pipe forming part of the system, and the buoyant effect resulting from the gas absorption, liquid displacement and heat in the gas, causes an upward flow through the riser. The pipe discharges into the bottom of a cooler, and this in turn into a tank. A downcomer pipe from the tank and connected to the bottom of the first pipe constitutes the return leg of the system. A relief valve for venting any non-condensed gases from the tank is provided, as the system is preferably operated under pressure to give an increased capacity and efficiency of gas absorption.

In the drawing accompanying this specification,

Fig. 1 is a diagrammatic showing of an apparatus embodying the invention;

Fig. 2 is a detail showing the gas inlet into the circulatory system.

The gases, generated in an autoclave 1, or by any other suitable means, are led through a pipe 2 into a liquid circulating system. This system comprises a riser pipe 3 which is surrounded or connected at or near its upper end to a cooler 4 and empties into the bottom of a tank 5. A downcomer pipe 6 from the bottom of tank 5 connects with the lower end of the riser 3 and completes the system.

The tank 5 is provided with a relief valve 7, and a pipe 8 for conducting gases leads therefrom into a scrubber 9 which discharges through a pipe 10. With the use of the relief valve, definite pressures can be maintained on the circulatory system.

As difficulty may be experienced in starting operations, on account of a reverse circulation down the pipe 3 caused by the water in the cooler 4 being colder than in the pipe 6, a valve 11 is inserted in the lower end of the downcomer pipe 6. Closing the valve 11 stops this initial flow downward in the pipe 6 and, opening it again immediately after the gas is admitted permits the normal flow to start. However, a properly constructed gas inlet into the pipe 3 is found to be sufficient to start a flow upwardly in pipe 3, and the valve 11 for this purpose becomes unnecessary. A drain 12 and valve 13 are provided to remove the liquor at the end of the operation.

The gas may be admitted into the system in various ways, but a construction that is found satisfactory is shown in Fig. 2. A T 14 connects the riser pipe 3 and the downcomer pipe 6, and a gas inlet tube 15 forming a continuation of the pipe 2 extends into the T in the direction of the riser 3. A plug 16 fits tightly about the tube and in the T to hold the tube in place and prevent any leakage.

From the above description, the operation of the apparatus is believed evident. The ammonia enters the bottom of pipe 3 into the confined unitary flowing stream of circulating water passing through pipes 6 and 3 and is absorbed in the water. The unabsorbed gases act as lifting means, while the absorbed gases decrease the specific gravity of the liquid and also impart heat to it. These three factors impel an upward circulation into the cooler 4, where heat is abstracted and further absorption may take place. The fluid mixture passes into the tank 5 where the unabsorbed gases separate, and the excess accumulation of these gases passes through the relief valve. The gases can be collected and scrubbed, as shown, or otherwise disposed of. When the desired degree of gas absorption has taken place, the liquid is drained from the system, and the system is refilled with fresh liquid, or with the solution present in the scrubber 9. For this purpose a valve controlled pipe line 17 connects the scrubber and the tank 5.

By means of this construction an efficient action is secured because of the intimate contact between the stream of water and the cocurrent flow of ammonia. The use of pressure on the system proportionately increases the capacity and at the same time gives a more efficient gas absorption. The cooler not only abstracts heat for promoting the thermal circulation, but it also assists in the condensation and consequent absorption of the gases. A positive rapid circulation of a stream of water from and to the body of water in tank 5 without the need of moving parts is insured by the combination of the three natural forces, the buoyant action of the gases, the decrease in specific gravity caused by absorption and condensation, and the thermal circulation induced by heat in the gases, and the circulation is further accelerated by the ejector construction adopted for the introduction of ammonia under pressure as the velocity of the jet of ammonia is imparted to the liquid system.

I claim:

1. A process for the production of aqua ammonia which comprises recirculating an aqueous liquid in a cyclic path comprising a confined flowing stream of said liquid and introducing ammonia into said flowing stream.

2. A process for the production of aqua ammonia which comprises recirculating an aqueous liquid in a cyclic path comprising a pool of said liquid and a confined flowing stream of the same, introducing ammonia into said stream, and cooling the thus treated liquid prior to recirculation for introduction thereinto of additional quantities of ammonia.

3. A process for the production of aqua ammonia which comprises recirculating an aqueous liquid in a cyclic path comprising a pool of said liquid and a confined upwardly flowing stream of the same, introducing ammonia into said stream, and cooling the thus treated liquid prior to recirculation for introduction thereinto of additional quantities of ammonia.

4. A process for the production of aqua ammonia which comprises recirculating an aqueous liquid in a cyclic path comprising a pool of said liquid and a confined upwardly flowing stream of the same, introducing an upwardly directed jet of ammonia into said stream, cooling the thus treated liquid prior to recirculation for introduction thereinto of additional quantities of ammonia, withdrawing the unabsorbed gas from contact with the recirculating liquid, removing ammonia contained therein by absorption in water, and utilizing the ammoniacal solution thus formed as an aqueous liquid for the absorption of ammonia in the aforesaid manner.

WILLIAM L. SPALDING.